(12) United States Patent
Kosaka et al.

(10) Patent No.: US 6,959,541 B2
(45) Date of Patent: Nov. 1, 2005

(54) FUEL INJECTION CONTROL SYSTEM FOR INTERNAL COMBUSTION ENGINE

(75) Inventors: Yuji Kosaka, Obu (JP); Toshimi Matsumura, Chita-gun (JP)

(73) Assignee: DENSO Corporation, Kariya (JP)

(*) Notice: Subject to any disclaimer, the term of this patent is extended or adjusted under 35 U.S.C. 154(b) by 0 days.

(21) Appl. No.: 10/448,137

(22) Filed: May 30, 2003

(65) Prior Publication Data
US 2003/0221423 A1 Dec. 4, 2003

(30) Foreign Application Priority Data
Jun. 4, 2002 (JP) .............................. 2002-162424

(51) Int. Cl.$^7$ ................................................ F01N 3/00
(52) U.S. Cl. ............................. 60/295; 60/274; 60/285; 60/286; 60/297; 60/311
(58) Field of Search .......................... 60/284, 285, 286, 60/297, 311, 274

(56) References Cited
U.S. PATENT DOCUMENTS 4,719,751 A * 1/1988 Kume et al. .................. 60/285
5,974,791 A * 11/1999 Hirota et al. .................. 60/276
6,304,815 B1 * 10/2001 Moraal et al. ............... 701/115
6,412,276 B1 * 7/2002 Salvat et al. .................. 60/295
6,594,990 B2 * 7/2003 Kuenstler et al. ............. 60/295
6,622,480 B2 * 9/2003 Tashiro et al. ................ 60/295

FOREIGN PATENT DOCUMENTS
JP          04-047115    * 2/1992
JP          A-4-47115      2/1992
JP          A-7-279645    10/1995

* cited by examiner

Primary Examiner—Thomas Denion
Assistant Examiner—Diem Tran
(74) Attorney, Agent, or Firm—Nixon & Vanderhye P.C.

(57) ABSTRACT

An internal combustion engine has a particulate filter for collecting exhaust particulate matters included in exhaust gas. An oxidization catalyst is supported on the particulate filter. A fuel injection control system for the engine has injection quantity setting means. The injection quantity setting means sets an injection quantity for a post-injection so that the injection quantity is increased toward a basic injection quantity corresponding to a heating value, which is suitable for eliminating exhaust particulate matters collected by a particulate filter. The injection quantity is gradually increased to the basic injection quantity while maintaining temperature of the particulate filter including the oxidization catalyst above a lower limit temperature for inhibiting generation of white smoke. The lower limit temperature is determined in accordance with the injection quantity.

18 Claims, 4 Drawing Sheets

FUEL INJECTION CONTROL SYSTEM FOR INTERNAL COMBUSTION ENGINE

CROSS REFERENCE TO RELATED APPLICATION

This application is based on and incorporates herein by reference Japanese Patent Application No. 2002-162424 filed on Jun. 4, 2002.

BACKGROUND OF THE INVENTION

1. Field of the Invention

The present invention relates to a fuel injection control system for an internal combustion engine. Specifically, the present invention relates to a method for cleaning exhaust gas.

2. Description of Related Art

Improvement in exhaust emission of an internal combustion engine, which is mounted on a vehicle and the like, is required. Specifically, exhaust particulate matters such as soot or a soluble organic fraction included in the exhaust gas discharged from a compression-ignition type diesel engine running on diesel oil should be removed, as well as carbon oxide, hydrocarbon and nitrogen oxide. Therefore, a particulate filter made of a porous material is disposed in an exhaust passage of the diesel engine for collecting the exhaust particulate matters included in the exhaust gas.

Since the particulate filter is made of a porous material, flow resistance at the particulate filter may increase if an excessive quantity of the particulate matters is collected. As a result, back pressure of the engine may be increased, and the engine output may be decreased. Therefore, ability of the particulate filter to collect the exhaust particulate matters should be recovered by regenerating the particulate filter. The particulate filter is regenerated by eliminating the collected exhaust particulate matters.

A particulate filter having an oxidation catalyst such as platinum thereon can be regenerated during the operation of the engine with the use of an oxidization effect of the oxidization catalyst. For instance, a post-injection for injecting fuel in an expansion stroke or an exhaustion stroke of the engine is performed to provide the fuel to the particulate filter. Thus, the fuel is oxidized by the oxidization catalyst, generating reaction heat. Then, the particulate matters collected by the particulate filter are combusted and eliminated with the use of the heat. In the case in which the oxidization catalyst is supported on the porous material of the particulate filter, the particulate filter is heated up to a temperature suitable for combusting the exhaust particulate matters, which are more difficult to combust than normal fuel such as injection fuel.

Oxidization ability of the oxidization catalyst depends on the temperature. Therefore, there is a possibility that the oxidization ability of the catalyst may become insufficient even if a theoretical quantity of the fuel corresponding to the heating value required for eliminating the collected particulate matters is injected in the post-injection. As a result, white smoke, or an unburned fraction of the fuel, may be generated.

SUMMARY OF THE INVENTION

It is therefore an object of the present invention to provide a fuel injection control system for an internal combustion engine, which is capable of preventing emission of white smoke.

According to an aspect of the present invention, a fuel injection control system for an internal combustion engine, which has a particulate filter disposed in an exhaust passage for collecting exhaust particulate matters, performs a post-injection to inject fuel in an expansion stroke or an exhaustion stroke after a main injection. Thus, the particulate filter is heated with reaction heat generated in oxidization, which is performed by an oxidization catalyst. The oxidization catalyst is disposed upstream of the particulate filter or is supported on the particulate filter. Thus, the particulate matters collected by the particulate filter are combusted and eliminated, and the particulate filter is regenerated. Thus, ability of the particulate filter to collect the particulate matters is recovered.

The fuel injection control system has injection quantity setting means. The injection quantity setting means sets an injection quantity for the post-injection so that the injection quantity gradually increases toward a predetermined injection quantity corresponding to a heating value enabling elimination of the collected exhaust particulate matters, in an early stage of the regeneration of the particulate filter.

In the early stage of the regeneration of the particulate filter, that is, in a first post-injection and following post-injections in the early stage, the temperature around the oxidization catalyst is low, and the injection quantity is set at a low value. Then, as the temperature around the oxidization catalyst increases, the injection quantity is increased. Thus, the injection quantity of the fuel suitable for oxidization performance of the oxidization catalyst at the temperature is injected in the post-injection, even if the temperature around the oxidization catalyst is not increased enough in the early stage of the regeneration. As a result, generation of white smoke is prevented when the regeneration of the particulate filter is started.

BRIEF DESCRIPTION OF THE DRAWINGS

Features and advantages of an embodiment will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENT

Figure 1:
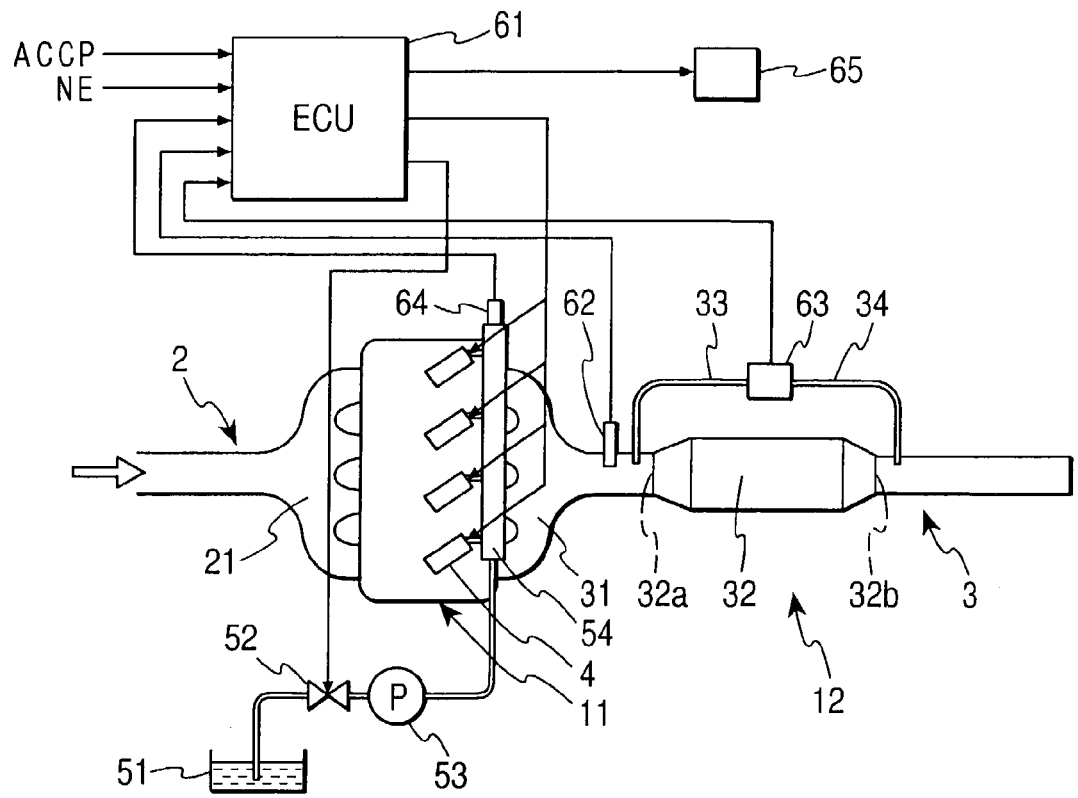
FIG. 1 is a diagram showing an internal combustion engine having a fuel injection control system according to an embodiment of the present invention.

Referring to FIG. 1, a diesel engine having a fuel injection control system according to an embodiment is illustrated. The diesel engine has a four-cylinder type engine main body 11 and an after treatment system 12. The engine main body 11 is connected with an intake manifold 21, which is the most downstream part of an intake passage 2, and with an exhaust manifold 31, which is the most upstream part of an exhaust passage 3. A particulate filter 32 is connected with the exhaust passage 3 in the downstream portion of a gathering point of the exhaust manifold 31. The particulate filter 32 is a substantial part of the after treatment system 12. The exhaust gas discharged from respective cylinders of the engine passes through the particulate filter 32. The particulate filter 32 has a common structure. For instance, the particulate filter 32 is made of a porous material such as ceramics, through which the exhaust gas can pass. An oxidization catalyst such as platinum is supported on the porous material.

Each cylinder is provided with an injector 4. The injector 4 is controlled to open or to close by an electronic control unit (ECU) 61, which controls respective parts of the diesel engine. The injector 4 injects a quantity of the fuel in accordance with its valve-opening period. The fuel is provided to the respective injectors 4 from a common rail 54, which is common to the entire injectors 4. The fuel drawn from a fuel tank 51 by a pump 53 is pressure-fed to the common rail 54. A control valve 52 controls the pressure-feeding quantity of the fuel from the pump 53 to the common rail 54. The ECU 61 controls the control valve 52 so that the fuel pressure in the common rail 54 (common rail pressure) becomes generally equal to a target pressure, based on a detection signal of a pressure sensor 64, which measures the common rail pressure. The target pressure is calculated based on an operating state of the engine.

The ECU 61 receives various signals indicating the operating state of the engine, from the pressure sensor 64 and the like. A temperature sensor 62 is disposed in the exhaust passage 3 at a portion just upstream of the particulate filter 32 so that the temperature sensor 62 penetrates a wall of the exhaust passage 3. The temperature sensor 62 measures DPF inlet temperature, or temperature of the passing exhaust gas at an inlet 32a of the particulate filter 32. The DPF inlet temperature indicates a state of the temperature of the particulate filter 32. When the DPF inlet temperature is high, it is determined that the temperature of the entire particulate filter 32 including the oxidization catalyst is increasing. Thus, the temperature sensor 62 can substantially measure the temperature of the oxidization catalyst of the particulate filter 32. The temperature sensor 62 can be easily mounted because there is no need to redesign the porous material of the particulate filter 32 and the like to attach the temperature sensor 62 thereto.

A first branch passage 33 and a second branch passage 34 are connected with the exhaust passage 3. The first branch passage 33 branches from the exhaust passage 3 at a portion just upstream of the particulate filter 32. The second branch passage 34 branches from the exhaust passage 3 at a portion just downstream of the particulate filter 32. A pressure difference sensor 63 interposed between the first and second branch passages 33, 34 measures a difference between a pressure at a portion just upstream of the particulate filter 32 and a pressure at a portion just downstream of the particulate filter 32.

The ECU 61 receives various parameters for indicating the operating state of the engine, such as an accelerator position ACCP and an engine rotation speed NE.

A warning light 65 is disposed on an instrument panel in a vehicle compartment. The ECU 61 turns on the warning light 65 when the regeneration of the particulate filter 32 is required or when an anomaly in the particulate filter 32 is detected, for instance.

Figure 2:
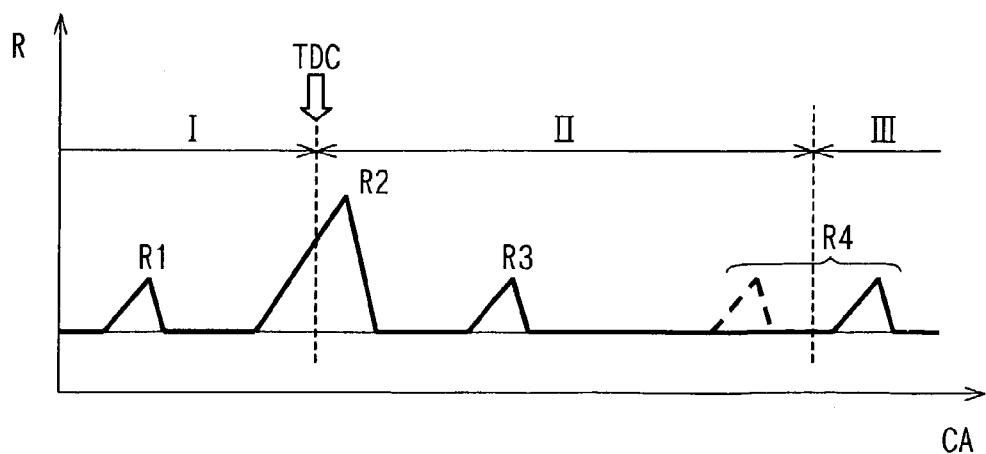
FIG. 2 is a timing chart showing an injection ratio in a cylinder of the engine having the fuel injection control system according to the embodiment.

FIG. 2 is a timing chart showing a fuel injection ratio "R" relative to a crank angle (CA). In order to bring a profile of the fuel injection ratio R to an ideal profile, a pre-injection is performed as shown by a projection "R1" in FIG. 2, before performing a main injection generally at a top dead center (TDC) in a compression stroke as shown by another projection "R2" in FIG. 2. In FIG. 2, a range "I" represents a compression stroke and a range "II" is an expansion stroke, and a range "III" is an exhaustion stroke. After the main injection, an after injection is performed in the expansion stroke as shown by a projection "R3" in FIG. 2, and a post-injection is performed in the expansion stroke or in an exhaustion stroke as shown by projections "R4" in FIG. 2. The after injection is performed to heat the particulate filter 32 to relatively high temperature by introducing high-temperature exhaust gas into the particulate filter 32, before the post-injection. The after injection is particularly effective when the exhaust gas temperature is low in an idling state of the engine, in which the engine rotation speed is low.

Figure 3:
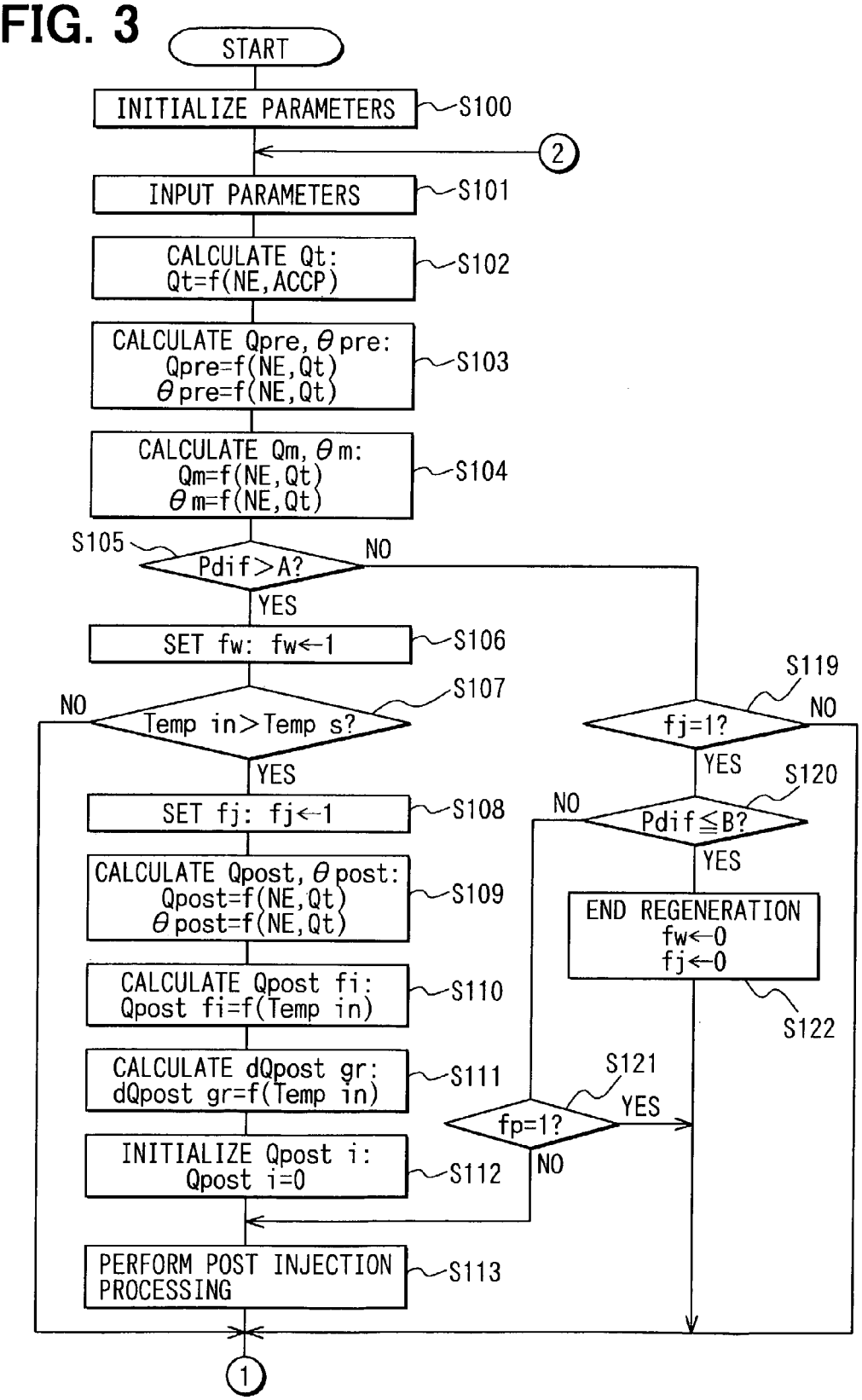
FIG. 3 is a part of a flowchart showing control performed by an electronic control unit (ECU) of the fuel injection control system according to the embodiment.
Figure 4:
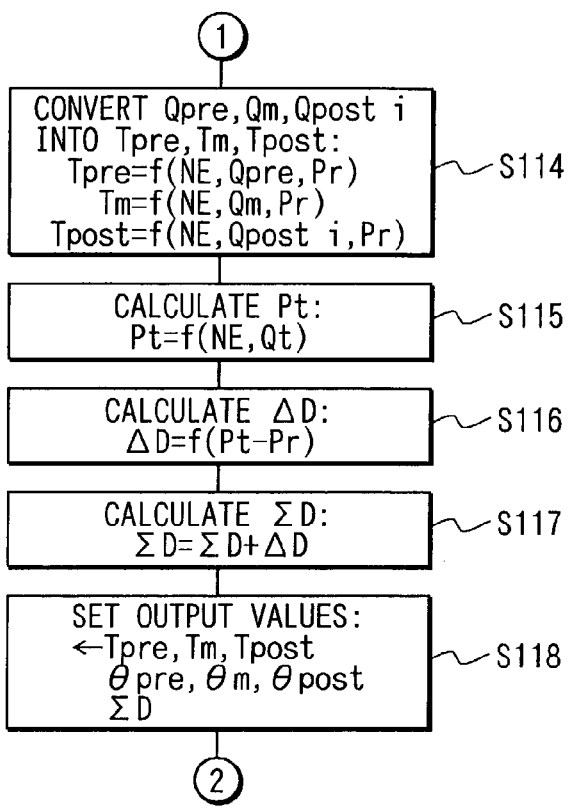
FIG. 4 is another part of the flowchart showing the control performed by the ECU of the fuel injection control system according to the embodiment.

Next, fuel injection control performed by the ECU 61 will be explained based on FIGS. 3, 4 and 5, centering on a processing for regenerating the particulate filter 32.

If an ignition switch is switched on, initialization is performed in Step S100. In the initialization, control parameters of the ECU 61 are set at initial values in order to prepare for following control.

Then, in Step S101, an accelerator position ACCP and an engine rotation speed NE as engine control parameters are inputted. Then, in Step S102, a total injection quantity Qt is calculated based on the inputted accelerator position ACCP and the engine rotation speed NE. The total injection quantity Qt is the sum of a pre-injection quantity Qpre and a main injection quantity Qm. Then, in Step S103, the pre-injection quantity Qpre and pre-injection timing θpre for the pre-injection are calculated based on the total injection quantity Qt and the engine rotation speed NE. Then, in Step S104, the main injection quantity Qm and main injection timing θm for the main injection are calculated based on the total injection quantity Qt and the engine rotation speed NE.

Then, in Step S105, a pressure difference Pdif between a pressure in the upstream portion and the downstream portion of the particulate filter 32 is compared with a predetermined value "A", and it is determined whether the pressure difference Pdif is greater than the predetermined value A or not. The predetermined value A is determined in accordance with a permissible upper limit of the pressure difference Pdif. The predetermined value A is set so that the pressure difference Pdif exceeds the predetermined value A before the pressure difference Pdif, or a back pressure of the engine, increases too much. If the result of the determination in Step S105 is "YES", it is determined that a quantity of the exhaust particulate matters depositing in the particulate filter 32 has reached a level at which the regeneration of the particulate filter 32 is required. Then, the processing proceeds to Step S106.

In Step S106, a regeneration processing waiting flag fw is set to 1 (fw=1). When the flag fw is set at 1, requirement for the regeneration of the particulate filter 32 is indicated. The flag fw is referred to in other routines or outputted to another ECU of the vehicle. If the flag fw is set to 1, the warning light 65 is turned on. Then, in Step S107, the DPF inlet temperature "Temp in", which is the temperature of the exhaust gas at the inlet 32a of the particulate filter 32, is compared with a predetermined temperature "Temp s", which is a threshold temperature. Thus, it is determined whether the DPF inlet temperature "Temp in" is higher than the predetermined temperature "Temp s" or not. The predetermined temperature "Temp s" is set in accordance with a lower limit temperature enabling the elimination of the particulate matters collected by the particulate filter 32. If the result of the determination in Step S107 is "YES", the processing proceeds to Step S108. Then, steps from Step S108 to Step S112 are performed for setting parameters required in a post-injection processing. Then, the post-injection processing is performed in Step S113. If the result of the determination in Step S107 is "NO", it is determined that the regeneration is impossible, and the processing proceeds to Step S114, skipping the steps from Step S108 to Step S113.

In Step S108, a regeneration performing flag fj for performing the regeneration is set to 1 (fj=1). Then, in Step S109, a basic post-injection quantity Qpost and post-injection timing θpost for the post-injection are calculated based on the total injection quantity Qt and the engine rotation speed NE. Then in Step S110, a first post-injection quantity "Qpost fi" is calculated based on the DPF inlet temperature "Temp in". Then, in Step S111, a post-injection quantity unit increase "dQpost gr", or a unit increase of gradual increase in the post-injection quantity, is calculated based on the DPF inlet temperature "Temp in". The first post-injection quantity "Qpost fi" and the post-injection quantity unit increase "dQpost gr" are set to smaller values respectively as the DPF inlet temperature "Temp in" becomes lower. For instance, the first post-injection quantity "Qpost fi" and the post-injection quantity unit increase "dQpost gr" are set based on a map, which is stored in ROM of the ECU 61 in advance for relating the first post-injection quantity "Qpost fi" or the post-injection quantity unit increase "dQpost gr" with the DPF inlet temperature "Temp in" respectively.

Then, in Step S112, a post-injection quantity "Qpost i", which is the post-injection quantity used during the regeneration, is reset ("Qpost i"=0).

Thus, the parameters for specifying details of the regeneration processing are set, and after that, the regeneration processing is performed in Step S113.

If the result of the determination in Step S105 is "NO", it is determined that the particulate filter 32 is being regenerated or the state of the particulate filter 32 has not yet reached the level at which the regeneration is required. In that case, the processing proceeds to Step S119, and it is determined whether the regeneration performing flag fj is set at 1 or not. If the result of the determination in Step S119 is "YES", it is determined that the particulate filter 32 is being regenerated, and the processing proceeds to Step S120. If the result of Step S119 is "NO", it is determined that the regeneration is not performed and the quantity of the collected particulate matters has not reached the level at which the regeneration is required. Then, the processing proceeds to Step S114, skipping the steps from Step S108 to Step S113.

In Step S120, the pressure difference Pdif is compared with a predetermined value "B", and it is determined whether the pressure difference Pdif is "equal to or less than" the predetermined value B or not. The predetermined value B is set at a pressure at which the quantity of the particulate matters depositing in the particulate filter 32 and the back pressure of the engine can be determined to be decreased sufficiently. If the result of the determination in Step S120 is "NO", the processing proceeds to Step S121. In Step S121, it is determined whether a post-injection ending flag fp is set at 1 (fp=1) or not. If the result of the determination in Step S121 is "YES", the processing proceeds to Step S114. If the result of the determination in Step S121 is "NO", the processing proceeds to Step S113. The post-injection ending flag fp is set to 1 when the post-injection is not permitted, that is, when the normal injection consisting of the pre-injection and the main injection is resumed.

When the result of the determination in Step S120 is "NO", it is determined that the pressure difference Pdif is greater than the predetermined value B and the quantity of the particulate matters depositing in the particulate filter 32 has not yet reached a level for ending the regeneration. In such a case, the post-injection processing is continued in Step S113 under a condition that the post-injection ending flag fp is not set at 1 (Step S121). If the post-injection ending flag fp is set at 1, the post-injection processing in Step S113 is not performed. If the post-injection processing in Step S113 is not performed, a period Tpost and the timing θpost for outputting an injection pulse for the post-injection are not processed in following steps from Step S114 to Step S118, and the actual post-injection is not performed.

Figure 5:
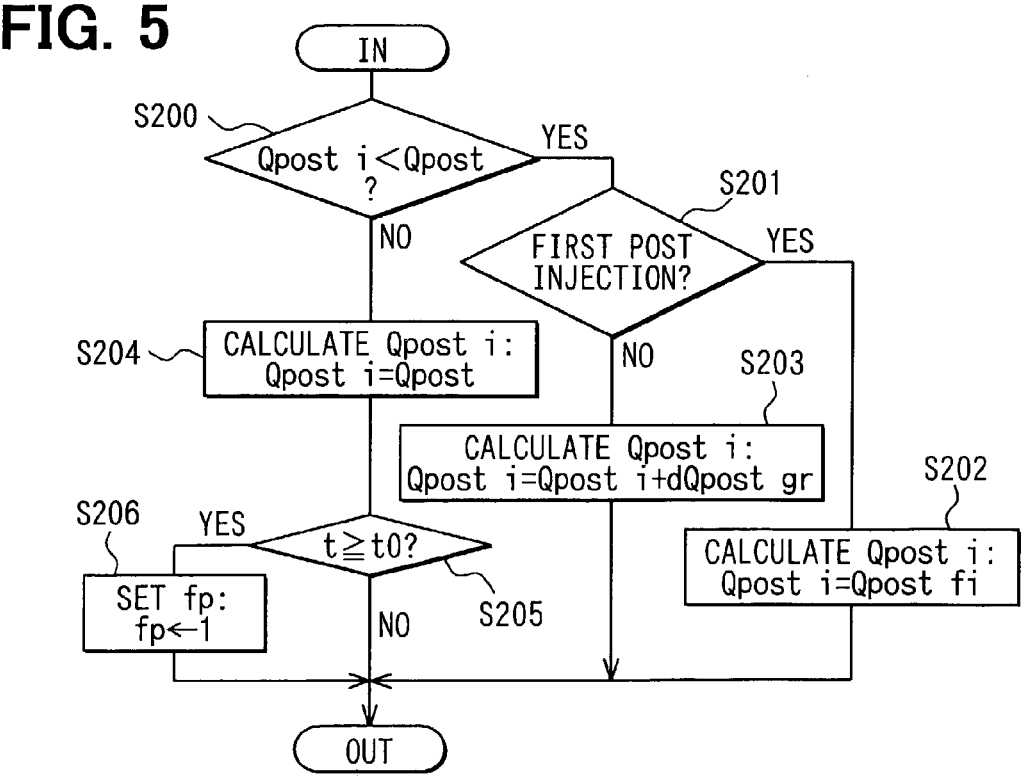
FIG. 5 is yet another part of the flowchart showing the control performed by the ECU of the fuel injection control system according to the embodiment.

In a subroutine shown in FIG. 5 of the post-injection processing of Step S113, first, the present post-injection quantity "Qpost i" is compared with the basic post-injection quantity Qpost in Step S200. Meanwhile, it is determined whether the post-injection quantity "Qpost i" is less than the basic post-injection quantity Qpost or not in Step S200. If the result of the determination in Step S200 is "YES", it is determined whether the post-injection is a first one or not in Step S201. Thus, it is determined whether the post-injection processing of Step S113 is performed for the first time or not since the flag fj is set to 1 in Step S108.

If the result of the determination in Step S201 is "YES", the post-injection quantity "Qpost i" is set to the first post-injection quantity "Qpost fi" in Step S202.

If the result of the determination in Step S201 is "NO", the post-injection quantity "Qpost i" is renewed by adding the post-injection quantity unit increase "dQpost gr" to the previous post-injection quantity "Qpost i" in Step S203.

Thus, the post-injection quantity "Qpost i" increases gradually and stepwise by the post-injection quantity unit increase "dQpost gr" from the first post-injection quantity "Qpost fi" unless the previous post-injection quantity "Qpost i" becomes equal to or greater than the basic post-injection quantity Qpost.

If the previous post-injection quantity "Qpost i" becomes equal to or greater than the basic post-injection quantity Qpost and the result of the determination in Step S200 becomes "NO", the processing proceeds to Step S204 and the post-injection quantity "Qpost i" is set to the basic post-injection quantity Qpost. The basic post-injection quantity Qpost is the final value of the post-injection quantity "Qpost i".

Then, in Step S205, it is determined whether an elapsed period t from the time when the post-injection quantity "Qpost i" reaches the basic post-injection quantity Qpost is "equal to or longer than" a predetermined period to or not. More specifically, in Step S205, it is determined whether the predetermined period t0 has passed or not from the time when the post-injection quantity "Qpost i" reaches the basic post-injection quantity Qpost. The elapsed period t may be counted by a timer, or a frequency of the negative determination in Step S200 may be counted after the regeneration performing flag fj is set to 1. If the result of the determination in Step S205 is "NO", the processing proceeds to Step S114. If the result of the determination in Step S205 is "YES", the post-injection ending flag fp is set to 1 (fp=1) in Step S206, and then, the processing proceeds to Step S114.

The post-injection quantity "Qpost i" gradually increases to the basic post-injection quantity Qpost. After that, the post-injection quantity "Qpost i" is maintained at the basic post-injection quantity Qpost for at most the predetermined period to. If the pressure difference Pdif becomes equal to or lower than the predetermined value B in Step S120 during the predetermined period t0, the post-injection is stopped, that is, the processing of Step S113 is not performed.

If the result of the determination in Step S120 is "YES", it is determined that the regeneration processing is ended, and the regeneration waiting flag fw and the regeneration performing flag fj are reset (fw=0, fj=0) in Step S122. Then, the processing proceeds to Step S114. More specifically, even after the regeneration processing in Step S113 is stopped, the regeneration waiting flag fw and the regeneration performing flag fj are not reset until the pressure difference Pdif becomes equal to or less than the predetermined value B in Step S120. Thus, it is not determined that the regeneration is ended until the pressure difference Pdif becomes equal to or less than the predetermined value B in Step S120.

In steps from Step S114 to Step S118, injection pulses and the like for the injector 4 are set based on the injection timing θpre, θm, θpost-injection quantities Qpre, Qm, "Qpost i" and the like. First, in Step S114, the injection quantities Qpre, Qm, "Qpost i" are converted into output periods of the injection pulses for driving the injector 4 based on the engine rotation speed NE and an actual injection pressure Pr. Thus, a pre-injection output period Tpre is calculated from the pre-injection quantity Qpre. A main injection output period Tm is calculated from the main injection quantity Qm. A post-injection output period Tpost is calculated from the post-injection quantity "Qpost i".

Then, in Step S115, a target injection pressure Pt for the injector 4 is calculated based on the engine rotation speed NE and the total injection quantity Qt.

Then, in Step S116, a correction value for the opening degree of the control valve 52 (pump control valve correction valve ΔD) is calculated based on a difference between the target injection pressure Pt and the actual injection pressure Pr. Then, in Step S117, a command value for the opening degree of the control valve 52 (pump control valve command value ΣD) is calculated by adding the pump control valve correction value ΔD to the previous pump control valve command value ΣD.

Then, in Step S118, the output periods Tpre, Tm, Tpost and the injection timing θpre, θm, θpost are set at a register of an output stage. The injector 4 opens for a predetermined period based on the set parameters from predetermined timing, and the fuel is injected in accordance with the valve opening period.

Then, the processing returns to Step S101, and the steps from Step S101 are repeated.

Figure 6:
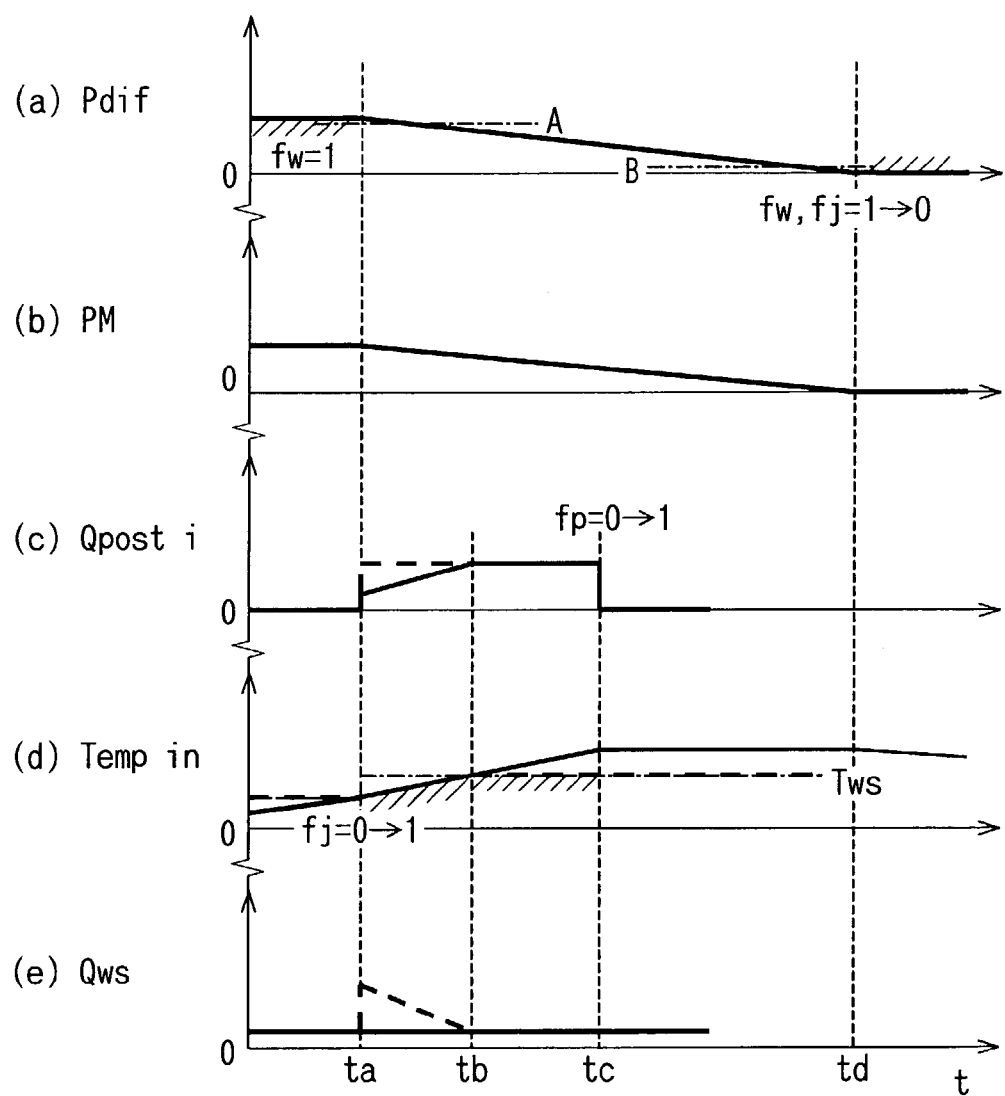
FIG. 6 is a timing chart showing a mode of fuel injection in the engine having the fuel injection control system according to the embodiment.

Next, an operating state of the diesel engine having the fuel injection control system of the embodiment will be explained based on FIG. 6. In the operating state shown in FIG. 6, the regeneration of the particulate filter 32 is performed. A solid line in a part (c) of FIG. 6 shows a transition of the post-injection quantity "Qpost i" in the case of the fuel injection control system of the embodiment. A broken line in the part (c) of FIG. 6 shows a transition of a post-injection quantity in the case of a conventional fuel injection control system. In the conventional fuel injection control system, a basic post-injection quantity Qpost calculated from the engine rotation speed NE and the total injection quantity Qt is used as the post-injection quantity. Actually, the fuel is injected intermittently in accordance with the rotation of the engine. The regeneration of the particulate filter 32 is required when the exhaust particulate matters deposit in the particulate filter 32 and the pressure difference Pdif exceeds the predetermined value A. If the regeneration of the particulate filter 32 is required, the regeneration processing waiting flag fw is set to 1 (fw=1). Then, after the DPF inlet temperature "Temp in" exceeds the temperature "Temp s", the regeneration of the particulate filter 32 is started at timing ta as shown in FIG. 6.

The oxidization ability of the oxidization catalyst is not sufficient at the time just after the start of the regeneration of the particulate filter 32, because the DPF inlet temperature "Temp in" has not increased enough as shown by a solid line in a part (d) of FIG. 6. In the part (d) of FIG. 6, a broken line shows a white smoke inhibition temperature Tws of the embodiment and a chained line shows another white smoke inhibition temperature Tws of the conventional system. The white smoke inhibition temperature Tws is a lower limit temperature for inhibiting the generation of the white smoke. More specifically, the generation of the white smoke is inhibited when the DPF inlet temperature "Temp in" is equal to or higher than the white smoke inhibition temperature Tws. The DPF inlet temperature "Temp in" at which the generation of the white smoke is inhibited depends on the post-injection quantity and increases as the post-injection quantity increases. It is because the more intensive oxidation ability is required as the post-injection quantity increases. In a mode of the post-injection in the conventional system, the white smoke inhibition temperature Tws is increased stepwise at the timing ta as shown in FIG. 6. However, the actual temperature cannot be increased so quickly with reaction heat generated in the oxidization at the catalyst of the particulate filter 32. Therefore, the white smoke may be generated in the conventional system as shown by a broken line in a part (e) of FIG. 6. Since the DPF inlet temperature "Temp in" increases gradually due to an effect of the post-injection, the quantity of the white smoke (Qws) decreases gradually as shown by the broke line in the part (e) of FIG. 6. Thus, the white smoke is discharged for a while, until the DPF inlet temperature "Temp in" increases to suitable temperature at timing tb as shown in FIG. 6.

On the other hand, in the embodiment, the post-injection quantity "Qpost i" is set at the first post-injection quantity "Qpost fi" at the time just after the start of the regeneration, at which the DPF inlet temperature "Temp in" is low. The first post-injection quantity "Qpsot fi" is less than the basic post-injection quantity Qpost. Then, the post-injection quantity "Qpost i" is increased gradually from the first post-injection quantity "Qpost fi" in accordance with the increase of the DPF inlet temperature "Temp in" as shown by the solid line in the part (c) of FIG. 6. Therefore, the white smoke inhibition temperature Tws increases gradually just after the start of the regeneration, and does not leave the actual DPF inlet temperature "Temp in" largely, as shown by the broken line in the part (d) of FIG. 6.

A map for relating the first post-injection quantity "Qpost fi" or the post-injection quantity unit increase "dQpost gr" to the DPF inlet temperature "Temp in" is made in advance through experimentation and the like. With the map, the DPF inlet temperature "Temp in" is set as close as possible to the white smoke inhibition temperature Tws in a range in which the DPF inlet temperature "Temp in" does not become less than the white smoke inhibition temperature Tws, and the post-injection quantity "Qpost i" corresponding to the DPF inlet temperature "Temp in" is provided.

Thus, the generation of the white smoke in the early stage of the regeneration of the particulate filter 32 is suitably prevented as shown by a solid line in the part (e) of FIG. 6.

If the predetermined period to passes from the timing tb at which the post-injection quantity "Qpost i" reaches the basic post-injection quantity Qpost, the post-injection is stopped at timing tc as shown in FIG. 6. After that, the temperature of the particulate filter 32 is maintained with combustion heat of the particulate matters depositing in the particulate filter 32. Meanwhile, the quantity of the particulate matters depositing in the particulate filter 32 is decreased gradually with the use of the heat as shown by a solid line in a part (b) of FIG. 6. Then, if the pressure difference Pdif becomes equal to or lower than the predetermined value B as shown by a solid line in a part (a) of FIG. 6, the regeneration of the particulate filter 32 is completed at timing td as shown in FIG. 6.

In the embodiment, the first post-injection quantity "Qpost fi" and the post-injection quantity unit increase "dQpost gr" are calculated based on the DPF inlet temperature "Temp in" at the time when the DPF inlet temperature "Temp in" exceeds the predetermined temperature "Temp s". Thus, the post-injection quantity "Qpost i" is increased stepwise. The post-injection quantity "Qpost i" need not be increased stepwise by a constant value, if the post-injection quantity "Qpost i" is increased gradually as the frequency of the post-injection increases. For instance, an optimum function determined through experimentation and the like so that the post-injection quantity "Qpost i" quickly reaches the basic post-injection quantity Qpost may be applied. Alternatively, the post-injection quantity "Qpost i" may be calculated based on the DPF inlet temperature "Temp in" for each post-injection when each post-injection is performed. In such a case, a map, in which the post-injection quantity "Qpost i" is set greater as the DPF inlet temperature "Temp in" increases, should be used.

The regeneration of the particulate filer 32 is permitted only when the DPF inlet temperature "Temp in" is higher than the predetermined temperature "Temp s". The predetermined temperature "Temp s" is set above the white smoke inhibition temperature Tws at the time when the post-injection quantity "Qpost i", is the first post-injection quantity "Qpost fi". Meanwhile, the predetermined temperature "Temp s" is set in accordance with the temperature at which the oxidization catalyst is activated. Thus, the generation of the white smoke is prevented more suitably.

The temperature of the oxidization catalyst is substantially measured by measuring the DPF inlet temperature "Temp in". Alternatively, the temperature of the porous material of the particulate filter 32 may be measured directly.

Whether the regeneration of the particulate filter 32 is required or not is determined based on the pressure difference Pdif. Alternatively, any other means capable of determining whether the quantity of the particulate matters reaches the level at which the regeneration of the particulate filter 32 is required or not may be applied.

In the embodiment, the oxidization catalyst is supported on the particulate filter 32. Alternatively, the oxidization catalyst may be disposed just upstream of the particulate filter 32.

In the case in which the oxidization catalyst is disposed upstream of the particulate filter 32, the temperature of the oxidization catalyst may be estimated from the measured temperature of the particulate filter 32, instead of measuring the temperature of the oxidization catalyst.

The present invention should not be limited to the disclosed embodiment, but may be implemented in many other ways without departing from the spirit of the invention.

What is claimed is:

1. A fuel injection control system of an internal combustion engine having a particulate filter disposed in an exhaust passage for collecting particulate matters included in exhaust gas, wherein the engine performs a post-injection in an expansion stroke or an exhaust stroke after a main injection and heats the particulate filter with reaction heat generated when fuel injected in the post-injection is combusted by an oxidization catalyst in order to eliminate the collected exhaust particulate matters by combustion and to regenerate ability of the particulate filter to collect the exhaust particulate matters, the system comprising:

temperature measuring means for measuring temperature of the exhaust gas at the inlet portion of the particulate filter, the temperature measuring means being disposed upstream of the oxidization catalyst and the particulate filter; and injection quantity setting means for setting a post-injection quantity for the post-injection so that the post-injection quantity increases in accordance with an increase in the temperature of the exhaust gas measured by the temperature measuring means in an early stage of the regeneration of the particulate filter;

wherein the injection quantity setting means sets the post-injection quantity for a first post-injection to be smaller than a predetermined injection quantity corresponding to a heating value at which the collected exhaust particulate matters can be eliminated when the measured temperature is lower than a white smoke inhibition temperature.

2. The fuel injection control system as in claim 1, wherein the injection quantity setting means sets the post-injection quantity so that a gradual increase in the post-injection quantity is set to a smaller value as the measured temperature becomes lower.

3. The fuel injection control system as in claim 1, further comprising:

determining means for determining whether the system performs the regeneration of the particulate filter or not, wherein the determining means determines to perform the regeneration of the particulate filter under conditions including a condition that the measured temperature is higher than a predetermining threshold value.

4. The fuel injection control system as in claim 1, wherein the injection quantity setting means sets the post-injection quantity for the post-injection so that the post-injection quantity gradually increases toward a predetermined injection quantity in the early stage of the regeneration of the particulate filter, the predetermined injection quantity corresponding to a heating value at which the collected exhaust particulate matters can be eliminated.

5. The fuel injection control system as in claim 1, wherein the oxidization catalyst is supported on the particulate filter.

6. A method of controlling fuel injection in an internal combustion engine having a particulate filter disposed in an exhaust passage for collecting particulate matters included in exhaust gas, the method comprising:

performing a post-injection in an expansion stroke or an exhaust stroke of the engine after a main injection and heating the particulate filter with reaction heat generated when fuel injected in the post-injection is combusted by an oxidization catalyst in order to eliminate the collected exhaust particulate matters by combustion and to regenerate ability of the particulate filter to collect the exhaust particulate matters;

measuring a temperature of the exhaust gas at an inlet portion of the particulate filter with a temperature measuring device disposed upstream of the oxidization catalyst and the particulate filter; and setting a post-injection quantity for the post-injection so that the post-injection quantity increases in accordance with an increase in the measured temperature of the exhaust gas;

wherein the post-injection quantity is set for a first post-injection to be smaller than a predetermined injection quantity corresponding to a heating value at which the collected exhaust particulate matters can be eliminated when the measured temperature is lower than a white smoke inhibition temperature.

7. The method as in claim 6, wherein the post-injection quantity is set so that a gradual increase in the post-injection quantity is set to a smaller value as the measured temperature becomes lower.

8. The method as in claim 6, further comprising:
determining whether the regeneration of the particulate filter is performed or not, and
performing the regeneration of the particulate filter under conditions including a condition that the measured temperature is higher than a predetermined threshold value.

9. The method as in claim 6, wherein the post-injection quantity for the post-injection is set so that the post-injection quantity gradually increases toward a predetermined injection quantity in the early stage of the regeneration of the particulate filter, the predetermined injection quantity corresponding to a heating value at which the collected exhaust particulate matters can be eliminated.

10. The method as in claim 6, wherein the oxidization catalyst is supported on the particulate filter.

11. A fuel injection control system of an internal combustion engine having a particulate filter disposed in an exhaust passage for collecting particulate matters included in exhaust gas, wherein the engine performs a post-injection in an expansion stroke or an exhaust stroke after a main injection and heats the particulate filter with reaction heat generated when fuel injected in the post-injection is combusted by an oxidization catalyst in order to eliminate the collected exhaust particulate matters by combustion and to regenerate ability of the particulate filter to collect the exhaust particulate matters, the system comprising:

temperature measuring means for measuring temperature of the exhaust gas at the inlet portion of the particulate filter, the temperature measuring means being disposed upstream of the oxidization catalyst and the particulate filter; and injection quantity setting means for setting a post-injection quantity for the post-injection so that the post-injection quantity increases in accordance with an increase in the temperature of the exhaust gas measured by the temperature measuring means in an early stage of the regeneration of the particulate filter;

wherein the injection quantity setting means sets the post-injection quantity so that a gradual increase in the post-injection quantity is set to a smaller value as the measured temperature becomes lower.

12. The fuel injection control system as in claim 11, further comprising:
determining means for determining whether the system performs the regeneration of the particulate filter or not,
wherein the determining means determines to perform the regeneration of the particulate filter under conditions including a condition that the measured temperature is higher than a predetermined threshold value.

13. The fuel injection control system as in claim 11, wherein the injection quantity setting means sets the post-injection quantity for the post-injection so that the post-injection quantity gradually increases toward a predetermined injection quantity in the early stage of the regeneration of the particulate filter, the predetermined injection quantity corresponding to a heating value at which the collected exhaust particulate matters can be eliminated.

14. The fuel injection control system as in claim 11, wherein the oxidization catalyst is supported on the particulate filter.

15. A method of controlling fuel injection in an internal combustion engine having a particulate filter disposed in an exhaust passage for collecting particulate matters included in exhaust gas, the method comprising:

performing a post-injection in an expansion stroke or an exhaust stroke of the engine after a main injection and heating the particulate filter with reaction heat generated when fuel injected in the post-injection is combusted by an oxidization catalyst in order to eliminate the collected exhaust particulate matters by combustion and to regenerate ability of the particulate filter to collect the exhaust particulate matters;

measuring a temperature of the exhaust gas at an inlet portion of the particulate filter with a temperature measuring device disposed upstream of the oxidization catalyst and the particulate filter; and setting a post-injection quantity for the post-injection so that the post-injection quantity increases in accordance with an increase in the measured temperature of the exhaust gas;

wherein the post-injection quantity is set so that a gradual increase in the post-injection quantity is set to a smaller value as the measured temperature becomes lower.

16. The method as in claim 15, further comprising:
determining whether the regeneration of the particulate filter is performed or not, and
performing the regeneration of the particulate filter under conditions including a condition that the measured temperature is higher than a predetermined threshold value.

17. The method as in claim 15, wherein the post-injection quantity for the post-injection is set so that the post-injection quantity gradually increases toward a predetermined injection quantity in the early stage of the regeneration of the particulate filter, the predetermined injection quantity corresponding to a heating value at which the collected exhaust particulate matters can be eliminated.

18. The method as in claim 15, wherein the oxidization catalyst is supported on the particulate filter.

* * * * *